United States Patent [19]
Youtsey et al.

[11] 3,992,212
[45] *Nov. 16, 1976

[54] ELECTRICAL RESISTOR INKS

[75] Inventors: Karl J. Youtsey, Chicago; William C. Holt, Jr., Prospect Heights; Robert D. Carnahan, Barrington, all of Ill.

[73] Assignee: Universal Oil Products Company, Des Plaines, Ill.

[ * ] Notice: The portion of the term of this patent subsequent to Mar. 21, 1989, has been disclaimed.

[22] Filed: Sept. 12, 1974

[21] Appl. No.: 505,405

Related U.S. Application Data

[63] Continuation-in-part of Ser. No. 281,880, Aug. 18, 1972, Pat. No. 3,846,140.

[52] U.S. Cl. .................................... 106/1; 106/20; 106/26; 106/30; 106/189; 106/193 M; 106/237; 106/241; 252/503; 252/502; 252/511; 252/514; 260/37 EP; 260/37 M
[51] Int. Cl.² .................... C09D 5/24; C09D 11/08
[58] Field of Search ............ 427/220; 252/502, 503, 252/511, 514; 106/1, 20, 26, 30, 193 M, 189, 237, 241; 260/37 EP, 37 M

[56] References Cited
UNITED STATES PATENTS

| | | | |
|---|---|---|---|
| 2,866,057 | 12/1958 | Peck | 252/503 |
| 2,886,476 | 5/1959 | Dumesnil et al. | 252/502 |
| 3,651,386 | 3/1972 | Youtsey et al. | 317/237 |
| 3,701,317 | 10/1972 | Miyamoto et al. | 252/514 |
| 3,711,428 | 1/1973 | Aycock et al. | 252/502 |
| 3,846,140 | 11/1974 | Youtsey et al. | 106/20 |
| 3,881,957 | 5/1975 | Hausler | 252/502 |

*Primary Examiner*—Lorenzo B. Hayes
*Attorney, Agent, or Firm*—James R. Hoatson, Jr.; Raymond H. Nelson; William H. Page II

[57] ABSTRACT

Electrical resistor inks comprising a mixture of at least one semi-conducting pyropolymeric inorganic refractory oxide material and a vehicle consisting of a binder such as a synthetic resin or a varnish, and a suitable solvent or oil, etc., are useful in forming resistors in electrical circuits, especially on printed circuit boards and on the ceramic substrates used for thick film circuits. In addition, the ink may contain other components such as metal powders, anti-skinning agents, drying agents, colored pigments, waxes, etc.

11 Claims, No Drawings

ELECTRICAL RESISTOR INKS

CROSS-REFERENCE TO RELATED APPLICATION

This application is a continuation-in-part of our copending application Ser. No. 281,880 filed Aug. 18, 1972 now U.S. Pat. No. 3,846,140.

This invention relates to electrical resistor inks and more particularly to electrical resistor inks which contain at least one semi-conducting pyropolymeric inorganic refractory oxide material which possesses advantageous properties. In addition the invention also relates to resistors which are formed from these electrical resistor inks.

Heretofore it has been known in the prior art that resistor inks may be prepared by utilizing a carbon or graphite pigment in a resin binder. However, the use of carbon black or graphite has a number of disadvantages, among them: (a) the obtaining of a given resistance value may require incorporation of dielectric additives in the formulation because of the fixed low resistivity of carbon black and graphite, (b) the rheological properties of the inks are highly variable because of the variety of formulations required to produce a series of resistance values, (c) the electronic performance characteristics vary for the various formulations for the same reason, and (d) batch to batch reproducibility of a given formulation is poor because of the variability of carbon black and graphite properties. However, in contradistinction to this, we have now discovered that all of these disadvantages may be eliminated by utilizing at least one semi-conducting pyropolymeric inorganic refractory oxide material of the type hereinafter set forth in greater detail as the pigment of an electrical resistor ink. By utilizing these semi-conducting pyropolymeric inorganic refractory oxide materials which possess controllable resistivities, it is possible to obtain a broad range of reproducible resistor characteristics. The resistance value of the resistor made from a given ink is determined by the oxide material and is not dominated by the vehicle characteristics, as in the case of the carbon or graphite inks. By having a constant volume concentration of the oxide material in the primary vehicle for all resistance values, it is possible to insure uniform rheological properties for screening purposes. Another advantage of utilizing the electrical resistor inks of the present invention is that there will be relatively low current noise in the resulting resistors as contrasted with the noise level found when utilizing carbon or graphite inks. In addition, there is no requirement for electrical lead attachments, and the inks, when dried, are easily trimmed by conventional laser and/or abrasive trimming techniques. Yet another advantage of utilizing the electrical resistor inks of the present invention is that the curing of the ink formulations can be effected at room temperature or can be air or oven dried if desired. This contrasts to the carbon or graphite type resistor in formulations where the curing temperature is usually required to be relatively high, that is, 300° C. or more, for a period of several hours in order to attempt to achieve a stable resistance.

Electrical resistor inks which constitute the present invention may find a wide variety of uses in the electrical field. For example, one application of resistor inks is to produce direct substitutes for discrete resistors in all types of electrical circuits, a particularly advantageous use being in connection with laminated printed circuit boards. The electrical resistor ink can be applied to either side of the circuit board, that is, the component side or the foil side, prior to the final soldering step in which discrete components are electrically attached. In addition, either single- or multi-circuit boards are suitable. For example, in the latter case, where multiple layers of circuits are involved, direct incorporation of the printed resistors in the layers provides an obvious benefit in lower component densities where discrete components must be attached, thus resulting in a significant saving of space. In addition to the use hereinbefore described in laminated printed circuit boards the electrical resistor ink can be used in radiant heating panels for use in building construction in which the ink is applied to an inner sheet of panel prior to final lamination; coating an insulating fiber; as an anti-static spray to protect surfaces from static charge accumulation or as window defrosters in which the electrical resistor ink is applied in the form of a fine line to a window surface and after drying will act as a heating element. It is therefore readily apparent that the uses of an electrical resistor ink of the type hereinafter set forth in greater detail are widely varied and therefore an electrical resistor ink which possesses certain advantageous properties will be very desirable.

It is therefore an object of this invention to provide an electrical resistor ink which possesses certain advantageous properties.

Another object of this invention is to provide an electrical resistor ink containing, as one component thereof, a semi-conducting pyropolymeric inorganic refractory oxide material which possesses a resistivity within a desired range which will permit the use of the ink in certain applied situations.

In one aspect an embodiment of this invention resides in an electrical resistor ink comprising a resistive component dispersed in a liquid vehicle containing a binder of synthetic or natural resin and an oil solvent or mixture thereof, the improvement which comprises utilizing as a resistive component therefor from about 10% to about 90% by weight of a composition of at least one refractory inorganic oxide having a surface area of from 1 to about 500 square meters per gram with a mono-layer of a carbonaceous pyropolymer formed on the surface thereof, said semi-conducting pyropolymeric material being of a particle size of less than 20 microns and having a resistivity at room temperature of from about $10^{-2}$ to about $10^6$ ohm-centimeters.

A specific embodiment of this invention is found in an electrical resistor ink comprising a mixture of a semi-conducting pyropolymeric material which possesses a resistivity of $2.5 \times 10^{-2}$ ohm-centimeters and an epoxy resin.

Another specific embodiment of this invention is found in a resistor formed by applying an electrical resistor ink upon a solid surface and drying said ink.

Other objects and embodiments will be found in the following further detailed description of the present invention.

As hereinbefore set forth, the present invention is concerned with novel compositions of matter comprising an electrical resistor ink. The term "ink" as used in the present specification and appended claims will refer to a liquid composition of matter which may be used in the form of an ink, as a paste, as a paint, etc. The ink will comprise a mixture of at least one pyropolymeric material or a mixture of two or more semi-conducting pyropolymeric inorganic refractory oxide materials, each of which possesses a dissimilar resistivity and a vehicle. The vehicle may be a mixture of a synthetic or naturally occurring resin, binder and a solvent in which the oxide material or materials is suspended, or may be an oil, or a mixture of an oil and a separate binder. In addition, it is also contemplated within the scope of this invention, that the ink may also contain other added accessories, such as: anti-skinning agents, drying agents, colored pigments, dryers, waxes, talcs, extending or viscous varnishes, thinners, body gums, shorteners and lengtheners, perfumes, plasticizers, anti-foam compounds, and also, if so desired, other solids in the form of metal powders which may provide special electrical and/or rheological properties to the finished composition of matter.

As hereinbefore set forth, prior art inks or paints which contain carbon or graphite as the resistive component of the mixture are subject to certain disadvantages. For example, certain carbons result in resistors which have a poor load-life or will require high curing temperatures when admixed with resins in order to provide resistance values which are stable during use. Graphites, both naturally occurring and synthetic, are also subject to these same disadvantages and, in addition, may possess other disadvantages such as relatively high current noise characteristics. A further disadvantage is in batch to non-reproducibility of carbon and graphite ink formulation of ±25% to ±40% of the effective resistance values. By utilizing a semi-conducting pyropolymeric inorganic refractory oxide material of the type hereinafter set forth in greater detail as the resistive component of the finished composition of matter, it is possible to overcome these disadvantages and provide a resistor which is tough, flexible and flake-resistant; will compete cost effectively with discrete carbon resistors while yielding equivalent or superior performance characteristics; will have a relatively low current noise as contrasted with the carbon inks; and will require lower curing temperatures to provide a stable resistance.

In one embodiment of this invention the semi-conducting pyropolymeric inorganic refractory oxide material may comprise a mono-layer of a carbonaceous pyropolymer consisting of carbon and hydrogen formed on the surface of a high surface area refractory inorganic oxide material. In one aspect the semi-conducting pyropolymeric inorganic refractory oxide material may be prepared by heating an organic compound in the absence of oxygen and passing the pyrolyzable substance over the refractory oxide material in the vapor phase to deposit a carbonaceous pyropolymer thereon. The refractory oxide material which may be used as the base may be in any form such as loose or compacted dry powders, cast or calcined sols, heated sols, substrates in the form of flats, cylinders, and spheres, rods, pellets, etc. In the preferred embodiment of the present invention, the refractory inorganic oxide base will be characterized as having a high surface area of from 1 to about 500 square meters per gram. Illustrative examples of the refractory inorganic oxides which may be used will include alumina in various forms such as gamma-alumina and silica-alumina. In addition, it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the carbonaceous pyropolymer consisting of carbon and hydrogen on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromomethane, chloroethane, bromoethane, chloropropane, bromopropane, iodopropane, chlorobutane, bromobutane, iodobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-bytyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitro-propane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzaldehyde, acetophenone, benzophenone, benzoquinone, benzoic acid, phenyl acetate acid, hydrocynnamic acid, furan, furfural, pyran, coumarin, indole, carbohydrates such as sucrose, dextrose, fructose, etc. It is to be understood that the aforementioned compounds are only representative of the class of compounds which may undergo pyropolymerization and that the present invention is not necessarily limited thereto.

As hereinbefore set forth, one method of preparing the desired carbonaceous pyropolymers is to admix the aforementioned organic compounds with a carrier gas such as nitrogen or hydrogen, heating the mixture and passing said mixture over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the semi-conducting pyropolymeric inorganic refractory oxide material by regulating the temperature and the residence time during which the refractory oxide base is subjected to the treatment with the organic pyrolyzable substance. Another method of preparing the desired semi-conducting pyropolymeric inorganic refractory oxide material is to impregnate the refractory oxide such as alumina with an aqueous solution of a carbohydrate such as sucrose or dextrose, etc., dry the impregnated refractory oxide base at an elevated temperature and thereafter pyrolyze the dried impregnated base at temperatures in the range of those hereinbefore set forth for a predetermined period of time and thereafter recover the carbonaceous pyropolymer which is in a mono-layer on the refractory oxide base.

The thus prepared semi-conducting pyropolymeric inorganic refractory oxide material when recovered will possess a resistivity in the range of from about $10^0$ to about $10^8$ ohm-centimeters. However, if so desired, the semi-conducting pyropolymeric inorganic refractory oxide material may also be subjected to additional exposure to elevated temperatures ranging from about 500° to about 1200° C. in an inert atmosphere and in the absence of additional pyrolyzable materials for various predetermined periods of time, said treatment resulting in the reduction of the electrical resistivity of the lowest resistivity powders by as much as six orders of magnitude. Thus it is possible to prepare semi-conducting pyropolymeric inorganic refractory oxide materials in which the resistivity of said material will be in a range of from about $10^{-2}$ to about $10^0$ ohm-centimeters. By utilizing this additional treatment, the thermal stability of the pyropolymeric material will be improved with respect to temperature cycling in the resistor temperature range, that is, from about 0° to about 100° C., and to alteration of the temperature coefficient of resistance of the finished resistor. While the above material describes one specific method of preparing a semi-conducting pyropolymeric inorganic refractory oxide material, it is to be understood that we do not wish to be limited to this method of preparing the material, and that any suitable method in which a mono-layer of a carbonaceous pyropolymeric material is formed on the surface of a refractory oxide material may also be used to prepare the resistive component of the ink.

The aforementioned semi-conducting pyropolymeric inorganic refractory oxide material is admixed with other components which make up the final electrical resistor ink. These other components will act as a medium in which the semi-conducting pyropolymeric inorganic refractory oxide material is carried, and will comprise ingredients which will impart suitable rheological and drying properties to the ink during the application of said ink and desirable physical and electrical properties to the resistor after the ink has set. The suitable rheological properties are dictated by the particular procedure during the application. For example, if the ink is to be applied by silk screening, the ink must have the pseudoplastic properties of low viscosity at high shear rates and high viscosity at low shear rates. This allows the ink to be easily passed through the screen and at the same time will prevent an excessive flow after the application. In addition, drying times must be compatible with the application procedure, i.e., must be long enough to prevent equipment fouling but short enough to allow handling and resistor trimming at the earliest possible time. Another important aspect of the formulation of resistive inks is that an electrical continuity must be established between the conductive particles after the ink has dried. Therefore setting of the ink must involve a certain amount of shrinkage so that the excess vehicle or medium by the inter-particle contact points is eliminated. Vehicles which do not have this shrinking property merely encapsulate the conductive particles and do not produce a suitable resistive material. Furthermore, the vehicle properties which are imparted to the finished product constitute another important aspect of resistive ink formulations. The finished resistor, in addition to adhering firmly to the surface on which it is applied, must also make good electrical contact to conductors on which it is applied as well as being reasonably resistant to abrasion and reasonably mechanically flexible.

Therefore, the medium in which the semi-conducting propolymeric inorganic refractory oxide material is carried must meet the aforementioned qualifications. This medium in which the semi-conducting pyropolymeric inorganic refractory oxide material is carried will comprise a binder and a solvent or oil. Examples of binders which may comprise synthetic or naturally occurring compounds will include naturally occurring compounds such as casein, soya bean oil derivatives, shellac, natural rubber, natural resins such as copals, congos, kauris, gum batu, gilsonite, asphaltic pitches, rosin, shellac, gum elemi, mastic, etc., or synthetic compounds including thermoplastic resins such as polystyrene, polyamide, alkyd resins, acrylic esters, cellulose esters and ethers, polyvinyl alcohol derivatives, etc., or thermosetting resins such as phenolic resins, epoxy resins, melamine resins, unsaturated polyesters, vinyl copolymers resins, urea resins, or varnish, etc., the varnish comprising an oil varnish, a spar varnish, a bituminous varnish, etc.; nitrocellulose, ethyl cellulose.

The oils and solvents which comprise the other component of the vehicle are differentiated on the basis of their viscosity. For example, liquids with a viscosity of less than 0.1 poise at 77° F. are classified as solvents while liquids of a viscosity of greater than 1.0 poise at 77° F. are classified as oils, liquids with viscosities between the above two values being classified as either solvents or oils by convention. In addition, the oils may be classified into three groups depending upon their drying characteristics, these classes being (1) a drying oil, (2) a semi-drying oil, and (3) a non-drying oil. In the preferred embodiment of the present invention the preferred oil which may be used as the vehicle for the ink will comprise a drying oil, although other oils may be used as special ingredients for special purposes such as providing plasticity to the ink. Examples of drying oils which may be used will include linseed oil, tung oil, oiticica oil, perilla oil, dehydrated castor oil, safflower oil, soya bean oil, rosin oil, tall oil, hempseed oil, poppyseed oil, etc. Semi-drying oils which may be used include cottonseed oil, rapeseed oil, corn oil, etc. Examples of non-drying oils will include castor oil, peanut oil, olive oil, neatsfoot oil, lard oil, sperm oil, etc. The drying oils may be used as bodying agents, the viscosity of which may be controlled by metal-catalyzed oxidation or thermally-induced polymerization. The solvents which may be used with resin binders and the conductive material may be classified on the basis of their composition, said solvents including hydrocarbon solvents, alcohols, aldehydes, acids, ethers, ketones, glycols and esters. Some specific examples of solvents which may be employed include n-pentane, n-hexane, n-heptane, benzene, toluene, the isomeric xylenes, ethylbenzene, ethyl alcohol, n-propyl alcohol, isopropyl alcohol, n-butyl alcohol, acetaldehyde, propionaldehyde, butyraldehyde, acetic acid, propionic acid, phthalic acid, acetone, methyl ethyl ketone, methyl propyl ketone, methyl isopropyl ketone, methyl isobutyl ketone, ethyl propyl ketone, etc., ethylene glycol, diethylene glycol, triethylene glycol, mineral spirits, butyl acetate, amyl acetate, ethylene glycol monoethyl ether acetate, ethylene glycol monobutyl ether, ethylene glycol monoethyl ether, etc.

In addition to the three components hereinbefore set forth, it is also contemplated within the scope of this invention that the electrical resistor ink may also contain other components which will go to make up the finished composition of matter. For example, the electrical resistor ink may also contain a metal in the form of a powder whereby special electrical properties of the finished resistor may be obtained. Specific examples of these metal powders include copper, silver, gold, nickel, zinc, chromium, cadmium, cobalt, indium or iron, the first three metals being the preferred additives. In addition to the metals hereinbefore enumerated, it is also contemplated that other components which will impart certain properties to the electrical resistor ink may be added such as dryers, plasticizers, anti-skinning agents, waxes such as petroleum waxes, carnauba wax, talcs, perfumes to mask unpleasant odors or to hide the presence of vital ingredients, or a color pigment which may be used for coding purposes. Examples of dryers which may be added include other metal powders such as cobalt powder, manganese powder, lead powder or zirconium powder; plasticizers which may be added include soft resins, tributyl phosphate, castor oil; while antiskinning agents which may be added will include, for example, hydroquinone, catechol, resorcinol, guaiacol, pyrogallol, eugenol, 2,5-di-t-butylhydroquinone, 2-butanone oxime, 2-pentanone oxime, etc. It is to be understood that the aforementioned examples of binders, oils, solvents and additives are only representative of the class of compounds which may be used as components of electrical resistor inks, and that the present invention is not necessarily limited thereto.

The electrical resistor ink may be prepared in any suitable manner. For example, the semi-conducting pyropolymeric inorganic refractory oxide material which had been prepared according to the method hereinbefore set forth, or by any other method known in the art, may be prepared by grinding the material to an appropriate particle size, said particle size being determined by the desired rheological property of the vehicle, and by the requirements for screening, i.e., lines/inch, etc. In the preferred embodiment of the invention the most desired particle size is that which produces a colloidal suspension of the semi-conducting pyropolymeric inorganic refractory oxide material in the vehicle. Generally speaking, the material should possess a particle size of less than $20\mu$ and preferably particles less than $10\mu$ are desirable, the optimum size being less than $1\mu$. The thus prepared semi-conducting pyropolymeric inorganic refractory oxide material is then admixed with the medium by blending with the binder and with the oil or solvent. Alternatively, the semi-conducting pyropolymeric inorganic refractory oxide material will be admixed with the vehicle component such as the solvent and thereafter ground by means of a roll mill, colloidal mill or ball mill until the particle size previously determined, that is, less than $10\mu$ and, if so desired, less than $1\mu$ is obtained. Following this, the components may be thereafter blended with the binder by means of an inverted blender, mill, etc. The semi-conducting pyropolymeric inorganic refractory oxide material will be present in the finished electrical resistor ink in an amount determined by the rheological properties of the ink and the electrical and physical properties of the resistor which results therefrom. Generally speaking, the semi-conducting pyropolymeric inorganic refractory oxide material will be present in the finished electrical resistor ink in an amount in the range of from about 10% to about 95% by weight of the finished composition of matter and preferably in a range of from about 50 to about 90% by weight. As hereinbefore set forth, the electrical resistor ink may also contain other components of the type hereinbefore set forth in greater detail such as preserving agents, color pigments, dryers, plasticizers, etc. these components also being added to the three component mixture of the ink in necessary amounts. When admixing a metal powder of the class hereinbefore set forth with the semi-conducting pyropolymeric inorganic refractory oxide material to obtain desirable electrical and physical characteristics of the finished resistor, it is contemplated that the mixture of semi-conducting pyropolymeric inorganic refractory oxide material and metal powder will contain from about 95% to about 50% by weight of the semi-conducting pyropolymeric inorganic refractory oxide material and from about 5% to about 50% by weight of the metal powder. As was also hereinbefore set forth, it is also contemplated within the scope of this invention that two or more semi-conducting pyropolymeric inorganic refractory oxide materials which possess dissimilar resistivities may be admixed to form the resistive component of the ink. The ratio of a semi-conducting pyropolymeric inorganic refractory oxide material to another semi-conducting pyropolymeric inorganic refractory oxide material which is used in the admixture will depend upon which particular resistivity value is desired and so will vary accordingly.

The electrical resistor inks which have been prepared according to the process hereinbefore set forth and which may contain a wide variety of components are formulated for application by any of a variety of methods. Some examples of the way in which the electrical resistor ink may be applied include silk screening, printing, painting, spraying, etc., each application method presenting a different set of rheological conditions which must be met by the particular formulation of the vehicle in which the conductive material is carried. The electrical resistor ink is applied to an appropriate surface such as a printed circuit board in any convenient manner and upon completion of the drying step will form the desired resistor. The wet inks may be either air dried or taken through a predetermined temperature cycle to produce the finished resistor. The particular temperature which is to be employed in the drying cycle will, of course, be dependent upon the particular formulation of the ink vehicle, i.e., whether the vehicle contains a drying oil, a non-drying oil, a semi-drying oil, a solvent or mixtures thereof and may be adjusted to satisfy the individual requirements. The resistors of the finished product will be a function of the resistivity of the conductive material which is present and also of the geometry of the printed resistor. The adjustment of the final value of the resistor can be effected by trimming the particular resistor using standard techniques such as physically removing some of the resistive material by means of grit blasting or by removal of the material utilizing a laser beam.

The resistor after removal of the solvent or oil will form a material, the surface of which possesses a considerable toughness and strength and will be able to withstand abrasion. Therefore, it is contemplated within the scope of this invention to employ the thus formed resistor as a variable resistor in which the electrical contact may be moved over the surface of said resistor utilizing a sufficient amount of pressure to insure complete contact at all times without changes in the resistance due to wear on the surface of the resistor caused by the aforesaid abrasion.

The following examples are given to illustrate the electrical resistor inks and resistors of the present invention. However, these examples are not intended to limit the generally broad scope of the present invention in strict accordance therewith.

EXAMPLE I

In this example 4 grams of gamma-alumina was impregnated with 560 ml of a dextrose solution which was prepared by dissolving 750 grams of dextrose in 1 liter of water, said 560 ml weighing 773 grams. The impregnated alumina was dried in a microwave oven, the alumina impregnated with dextrose weighing 737.5 grams after drying. The dextrose impregnated alumina was loaded onto a Lindberg muffle furance and pyrolyzed in a nitrogen atmosphere at a temperature of 905° C. for a period of 2.5 hours. The resistivity of the semi-conducting pyropolymeric inorganic refractory oxide material was determined to be $1.0 \times 10^{-1}$ ohm-centimeters. Following this, the semi-conducting pyropolymeric inorganic refractory oxide material was milled in a ball mill until a size of less than 10 microns was reached. When the material had been ground to the desired size, three electrical resistor inks were prepared by mixing the material with an epoxy resin known in the trade as Transene Epoxy 330 (the epoxy being a fluid thermoset material which possesses a viscosity of 720 cps at 25° C.), the semi-conducting pyropolymeric material and the epoxy being admixed in ratios of 1:1, 3:1 and 5:1 respectively. The electrical resistor inks were screened onto laminated circuit boards and cured for a period of 4 hours at a temperature of 155° C. The resulting resistors were measured and found to possess sheet resistivities of $18.5 \times 10^3$, $4.5 \times 10^3$, and 900 ohms/sq. respectively.

EXAMPLE II

In this example a similar semi-conducting pyropolymeric inorganic refractory oxide material was prepared according to the method set forth in Example I above, the difference being that the dextrose impregnated alumina was pyrolyzed in a nitrogen atmosphere at a temperature of 925° C. for a period of 2.5 hours. The resulting resistance of this material was found to be $2.5 \times 10^{-2}$ ohm-centimeters. After milling in a ball mill until a particle size of less than 10 microns was reached, the powder was admixed with an epoxy resin in a ratio of 3:1. The electrical resistor ink was screened on a laminated circuit board and cured at a temperature of 155° C. for a period of 4 hours. The resulting sheet resistivity of the resistor was found to be 200 ohms/sq.

EXAMPLE III

An electrical resistor ink was prepared by admixing a semi-conducting pyropolymeric inorganic refractory oxide material prepared according to the method set forth in Example I above with an equal amount of silver metal powder by weight, the admixture being made in a dry nitrogen environment. The resulting semi-conducting pyropolymeric inorganic refractory oxide material-silver metal powder was mixed in a 4:1 ratio with varnish, screened on a laminated circuit board and cured at a temperature of 140° C. for a period of 4 hours. The sheet resistivity of the resulting resistor was found to be less than 0.1 ohms/sq.

EXAMPLE IV

In this example 75 grams of a semi-conducting pyropolymeric inorganic refractory oxide material which was prepared by treating gamma-alumina with benzene at 700° C. for a period of 4 hours and which possessed a resistivity of $10^0$ ohm-centimeters was milled with 20 cc. of a solvent comprising isopropyl alcohol in a ball mill until the size of the semi-conducting pyropolymeric inorganic refractory oxide material was less than $10\mu$. When the semi-conducting pyropolymeric inorganic refractory oxide material had been ground to the desired size, 25 grams of a binder comprising varnish was added to the suspension and thoroughly admixed for an additional period of 0.5 hours. The resulting electrical resistor ink was painted on a laminated board in a strip which was ⅛ inch wide by ½ inch long and 0.005 inch thick. The resulting resistor was found to have a resistance of 100 ohms.

EXAMPLE V

An electrical resistor ink was prepared by suspending 80 grams of a semi-conducting pyropolymeric inorganic refractory oxide material, which was prepared by treating gamma-alumina with benzene at a temperature of 700° C. for a period of 3 hours and which possessed a resistivity of $10^2$ ohm-centimeters, in 100 cc of methyl isobutyl ketone. The suspension was milled for a period of time sufficient to reduce the particle size of the semi-conducting pyropolymeric inorganic refractory oxide material to less than $10\mu$. Upon reaching this size, 20 grams of a copolymeric mixture of vinyl chloride, vinyl acetate and vinyl alcohol resin was added and the mixture was mixed in an inverted blender to insure complete integration of the components. The resulting electrical resistor ink was again painted on a laminated board in a manner similar to that set forth in Example IV above, the resulting resistor possessing a resistance of $10^4$ ohms.

EXAMPLE VI

To prepare an electrical resistor ink, 75 grams of a semi-conducting pyropolymeric inorganic refractory oxide material which is prepared by treating gamma-alumina with butane in a nitrogen carrier at a temperature of 650° C. for a period of 4 hours and which will possess a resistivity of $10^4$ ohm-centimeters is suspended in 50 cc of methyl alcohol. The mixture is placed in a ball mill and treated to reduce the particle size of the semi-conducting pyropolymeric inorganic refractory oxide material to less than $10\mu$. When the particle size of the semi-conducting pyropolymeric inorganic refractory oxide material has reached the desired level, 25 grams of ethyl cellulose is added and the components mixed in an inverted blender for a period of 0.5 hours to insure complete integration of the components. The resulting electrical resistor ink is painted on a laminated board in a strip which is ⅛ inch wide by ½ inch long and 0.005 inch thick. After drying, the resulting resistor will have a resistance of $10^6$ ohms.

EXAMPLE VII

To illustrate another embodiment of the invention, 75 grams of a semi-conducting pyropolymeric inorganic refractory oxide material which is prepared by treating gamma-alumina with benzene at a temperature of 700° C. for a period of 4 hours and which possesses a resistivity of $10^0$ ohm-centimeters is suspended in 75 cc of mineral spirits. The mixture is milled in a ball mill to reduce the particle size of the semi-conducting pyropolymeric inorganic refractory oxide material to less than $10\mu$. After reaching this size, 10 grams of silver powder and 25 grams of an alkyd resin are added and the components are mixed in an inverted blender for a period of 0.5 hours. The electrical resistor ink is painted on a laminated board in a manner similar to that set forth in Example IV above, the resistor which is formed thereby possessing a resistance of 5 ohms.

EXAMPLE VIII

To illustrate the ability to control the resistivity of an ink an electrical resistor ink is prepared by admixing 78 grams of a semi-conducting pyropolymeric inorganic refractory oxide material which possesses a resistivity of $10^6$ ohm-centimeters and 2 grams of a semi-conducting pyropolymeric inorganic refractory oxide material which possesses a resistivity of 550 ohm-centimeters are suspended in 25 cc of isopropyl alcohol and the suspension is milled in a ball mill to reduce the particle size of the semi-conducting pyropolymeric inorganic refractory oxide material to less than $10\mu$. Following this, 20 grams of a binder comprising shellac is added and the components are thoroughly admixed in an inverted blender to insure complete integration of said components. The resulting electrical resistor ink is painted on a laminated board and upon drying, the resulting resistor will be found to possess a resistance of 10,000 ohms.

In contrast to this, when only the semi-conducting pyropolymeric inorganic refractory oxide material which possesses a resistivity of $10^6$ ohm-centimeters is suspended in isopropyl alcohol, milled to reduce the particles to the desired size and admixed with a binder comprising shellac, the ink, after being painted on a laminated board and dried, will form a resistor which possesses a resistance of 11,000 ohms. Thus it is possible to effectively control the desired resistivity of a resistor by admixing semi-conducting pyropolymeric inorganic refractory oxide materials possessing dissimilar resistivities in a predetermined ratio to provide a finished resistor which will possess a particularly desired resistance.

We claim as our invention:

1. In an electrical resistor ink comprising a resistive component dispersed in a liquid vehicle containing a binder of synthetic or natural resin and an oil solvent or mixture thereof, the improvement which comprises utilizing as a resistive component therefor from about 10% to about 90% by weight of a composition of at least one refractory inorganic oxide having a surface area of from 1 to about 500 square meters per gram with a mono-layer of a carbonaceous pyropolymer formed on the surface thereof, said semi-conducting pyropolymeric material being of a particle size of less than 20 microns and having a resistivity at room temperature of from about $10^{-2}$ to about $10^0$ ohm-centimeters.

2. The electrical resistor ink as set forth in claim 1 which contains a mixture of semi-conducting pyropolymeric materials, each of which possesses a different resistivity.

3. The electrical resistor ink as set forth in claim 1 which also contains a metal powder selected from the group consisting of copper, silver and gold.

4. The electrical resistor ink as set forth in claim 3 in which said semi-conducting pyropolymeric material is present in an amount in the range of from about 95% to about 50% by weight and said metal powder is present in an amount in the range of from about 5% to about 50% by weight.

5. The electrical resistor ink as set forth in claim 1 in which said semi-conducting pyropolymeric material possesses a resistivity of $10^{-1}$ ohm-centimeters and said vehicle is an epoxy resin.

6. The electrical resistor ink as set forth in claim 1 in which said semi-conducting pyropolymeric material possesses a resistivity of $2.5 \times 10^{-2}$ ohm-centimeters and said vehicle is an epoxy resin.

7. The electrical resistor ink as set forth in claim 3 in which said semi-conducting pyropolymeric material possesses a resistivity of $10^{-1}$ ohm-centimeters, said metal powder is silver and said vehicle is a varnish.

8. The electrical resistor ink as set forth in claim 1 in which said semi-conducting pyropolymeric material possesses a resistivity of $10^{-1}$ ohm-centimeters and said vehicle is ethyl cellulose and methyl alcohol.

9. The electrical resistor ink as set forth in claim 2 in which one of said semi-conducting pyropolymeric materials possesses a resistivity of $10^{-1}$ ohm-centimeters, the other of said semi-conducting pyropolymeric materials possesses a resistivity of $2.5 \times 10^{-2}$ ohm-centimeters and said vehicle is shellac and isopropyl alcohol.

10. A resistor formed by applying the electrical resistor ink of claim 1 upon a solid surface and drying said ink.

11. The resistor as set forth in claim 10 in which said semi-conducting pyropolymeric material is present in an amount of from about 50% to about 95% by weight of said dried ink.

* * * * *